United States Patent
Igasaki et al.

(10) Patent No.: US 8,191,408 B2
(45) Date of Patent: Jun. 5, 2012

(54) MEASURING INSTRUMENT

(75) Inventors: Shiro Igasaki, Kawasaki (JP); Masaoki Yamagata, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 437 days.

(21) Appl. No.: 12/494,954

(22) Filed: Jun. 30, 2009

(65) Prior Publication Data

US 2010/0000307 A1    Jan. 7, 2010

(30) Foreign Application Priority Data

Jul. 1, 2008   (JP) ................................. 2008-172334

(51) Int. Cl.
*G01B 5/26* (2006.01)
(52) U.S. Cl. ................ 73/105; 33/503; 33/556
(58) Field of Classification Search .................. 73/105; 33/503, 504, 551, 555, 556, 559
See application file for complete search history.

(56) References Cited

U.S. PATENT DOCUMENTS 6,457,366 B1    10/2002   Hidaka et al.

FOREIGN PATENT DOCUMENTS

| EP | 0204277 A1 | 12/1986 |
| EP | 1857775 A1 | 11/2007 |
| EP | 1865281 A1 | 12/2007 |
| JP | 2007-309684 | 11/2007 |

*Primary Examiner* — Daniel Larkin
(74) *Attorney, Agent, or Firm* — Rankin, Hill & Clark LLP

(57) ABSTRACT

A surface texture measuring instrument includes a contact piece to be in contact with an object, a sensor driving mechanism that moves the contact piece along the surface of the object, a controller that controls the sensor mechanism, and a force sensor that detects a measuring force exerted on the contact piece when the contact piece is brought into contact with the object. The controller includes a target value output that outputs a target value of the measuring force, a feedback controller that performs feedback control of the sensor driving mechanism based on a deviation between the measuring force and the target value, and a feedback compensator provided on the feedback controller. The feedback compensator performs feedback compensation in accordance with the measuring force.

3 Claims, 7 Drawing Sheets

MEASURING INSTRUMENT

The entire disclosure of Japanese Patent Application No. 2008-172334, filed Jul. 1, 2008, is expressly incorporated by reference herein.

BACKGROUND OF THE INVENTION

1. Field of the Invention

The present invention relates to a measuring instrument, and more particularly to a measuring instrument having a contact piece to be in contact with an object to be measured.

2. Description of Related Art

There has been known a measuring instrument which includes a contact piece to be in contact with an object to be measured, a moving mechanism that moves the contact piece along a surface of the object to be measured, and a controller that controls the moving mechanism (for example, see Document 1: JP-A-2007-309684).

A coordinate measuring instrument disclosed in Document 1 includes a probe (contact piece), a relative moving mechanism (moving mechanism), a controller, and a force sensor (measuring force detector) that detects a measuring force exerted on the probe when the probe is brought into contact with an object to be measured. The controller performs feedback control of the relative moving mechanism based on a deviation of the measuring force relative to a predetermined target measuring force (target value). Accordingly, a surface texture of the object is measured by moving the probe along the surface of the object while keeping the measuring force exerted on the probe substantially constant.

Incidentally, in a typical measuring instrument, when high-speed responsivity is required for a feedback controller such as when a surface of an object to be measured is rugged or when a probe is moved at high speed, the probe is moved away from the object and therefore a surface texture of the object cannot be measured.

On the other hand, since the coordinate measuring instrument disclosed in Document 1 includes a force control compensator for series compensation of a feedback controller, high-speed responsivity of the feedback controller can be improved by increasing a compensation element of the force control compensator.

However, response characteristics of the feedback controller depend on response characteristics of the compensation element of the force control compensator, the force sensor of the feedback controller, the relative moving mechanism and the like. Thus, when the compensation element of the force control compensator is unlimitedly increased, stability of the feedback controller may be impaired.

SUMMARY OF THE INVENTION

An object of the invention is to provide a measuring instrument capable of improving high-speed responsivity and measuring accuracy without impairing stability of a feedback controller.

A measuring instrument according to an aspect of the invention includes: a contact piece to be in contact with an object; a moving mechanism that moves the contact piece along a surface of the object; a controller that controls the moving mechanism; and a measuring force detector that detects a measuring force exerted on the contact piece when the contact piece is brought into contact with the object, in which the controller includes: a target value output that outputs a target value of the measuring force; a feedback controller that performs feedback control of the moving mechanism based on a deviation between the measuring force and the target value; and a feedback compensator provided on the feedback controller, and the feedback compensator performs feedback compensation in accordance with the measuring force.

According to the aspect of the invention, the controller includes the feedback compensator for feedback compensation in accordance with the measuring force. Accordingly, the measuring force outputted from the feedback compensator (hereinafter referred to as a compensation measuring force) can be adjusted so that the contact piece is not easily moved away from the object during measurement. The controller further includes the feedback controller for feedback control of the moving mechanism based on the deviation between the compensation measuring force and the target value outputted from the target value output. Accordingly, the contact piece is not easily moved away from the object even when high-speed responsivity is required for the feedback controller. Thus, the measuring instrument can improve high-speed responsivity and measuring accuracy without impairing stability of the feedback controller.

In the measuring instrument according to the aspect of the invention, the feedback compensator preferably compares the target value with the measuring force and performs the feedback compensation to increase the deviation when the measuring force is equal to or smaller than the target value.

According to the above arrangement, the feedback compensator performs the feedback compensation to increase the deviation between the compensation measuring force and the target value when the measuring force detected by the measuring force detector is equal to or smaller than the target value. Accordingly, the moving mechanism is controlled to increase the measuring force detected by the measuring force detector.

Therefore, even when high-speed responsivity is required for the feedback controller, the contact piece is not easily spaced away from the object during measurement. Thus, the measuring instrument can improve high-speed responsivity without impairing stability of the feedback controller.

In the measuring instrument according to the aspect of the invention, the feedback compensator preferably performs the feedback compensation to decrease the deviation when the measuring force is larger than the target value.

According to the above arrangement, the feedback compensator performs the feedback compensation to decrease the deviation between the compensation measuring force and the target value when the measuring force detected by the measuring detector is larger than the target value. Accordingly, the moving mechanism is controlled to decrease the measuring force detected by the measuring force detector. Therefore, even when the contact piece is suddenly bounced up due to the geometry variation of the object, the measuring force is not excessively changed, so that a control command for moving the contact piece excessively away from the object is not supplied. Thus, the contact piece is not easily moved away from the object.

DETAILED DESCRIPTION OF PREFERRED EMBODIMENT(S)

[First Exemplary Embodiment]

A first exemplary embodiment of the invention will be described below with reference to the accompanying drawings.

[Overall Arrangement of Surface Texture Measuring Instrument]

Figure 1:
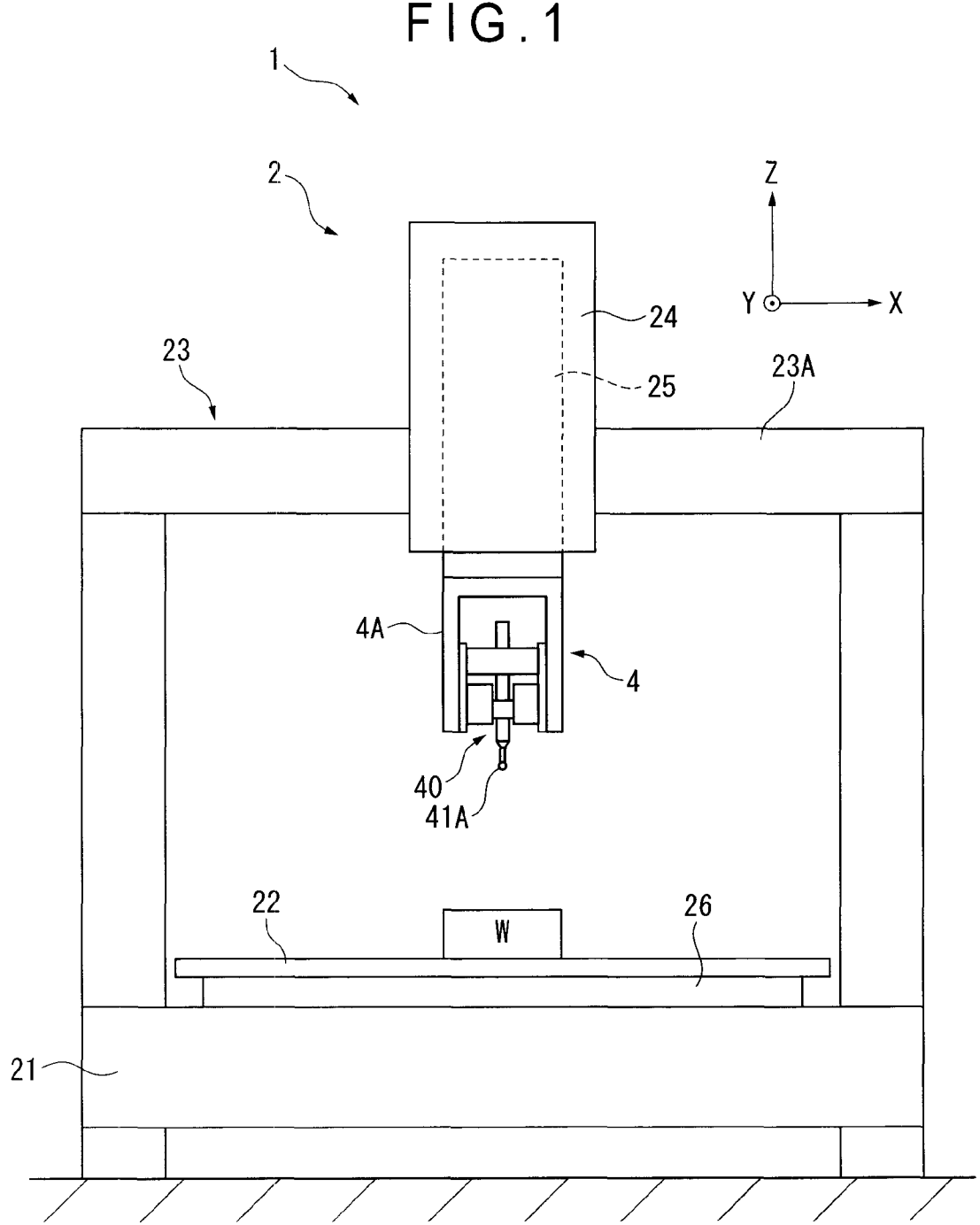
FIG. 1 is a front view of a surface texture measuring instrument according to a first exemplary embodiment of the invention.
Figure 2:
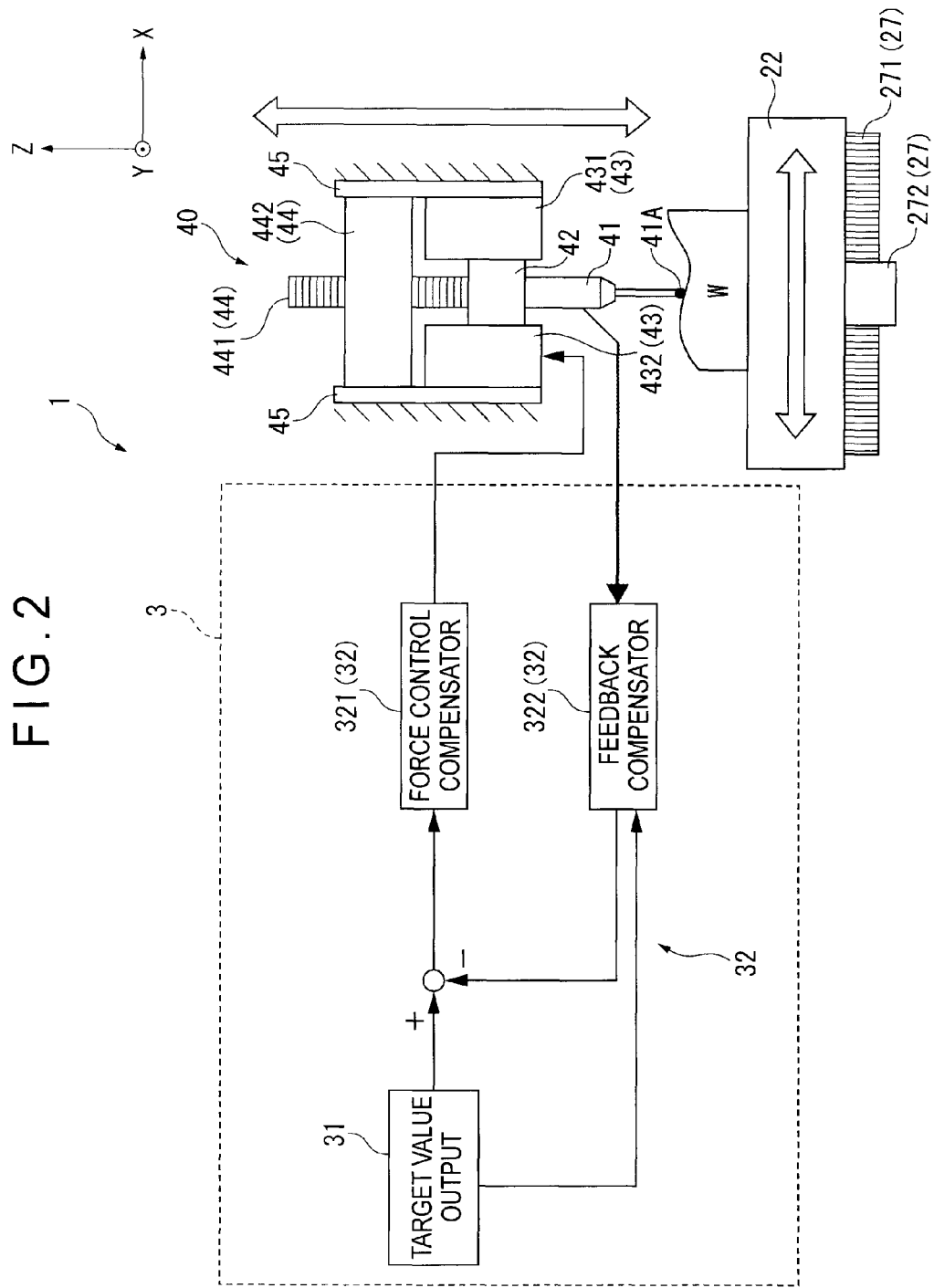
FIG. 2 is a block diagram schematically showing the surface texture measuring instrument according to the first exemplary embodiment.

FIG. 1 is a front view of a surface texture measuring instrument 1 according to a first exemplary embodiment of the invention. FIG. 2 is a block diagram schematically showing the surface texture measuring instrument 1. Incidentally, in FIGS. 1 and 2, an upper direction on the paper surface is referred to as a +Z-axis direction, two axes orthogonal to the Z-axis are respectively referred to as an X-axis (parallel to the paper surface) and a Y-axis (orthogonal to the paper surface). The same applies to the other figures.

The surface texture measuring instrument 1 (serving as a measuring instrument) includes a measuring instrument body 2 as shown in FIG. 1 and a controller 3 that controls the measuring instrument body 2 (see FIG. 2). The controller 3 will be described in greater detail below.

The measuring instrument body 2 includes: a base 21 provided on a floor; an XY stage 22 on which an object W is mounted, the XY stage 22 being provided on the base 21; a portal frame 23 provided over an upper surface of the base 21; a slider 24 provided on a cross rail 23A of the portal frame 23; an arm 25 accommodated in the slider 24; and a probe 4 provided on a distal end of the arm 25 in a −Z-axis direction and having a contact piece 41A to be brought into contact with the object W.

The XY stage 22, which is movable on the upper surface (XY plane) of the base 21, includes a stage driving mechanism 26 interposed between the base 21 and the XY stage 22 for moving the XY stage 22 in the X- and Y-axis directions.

The slider 24, which is movable in the X-axis direction, includes a slider driving mechanism (not shown) that moves the slider 24 in the X-axis direction.

The arm 25, which is movable in the Z-axis direction, includes an arm driving mechanism (not shown) that moves within the slider 24 in the Z-axis direction.

The probe 4 includes a probe body 40 and a case 4A for accommodating the probe body 40 therein.

As shown in FIG. 2, the probe body 40 includes: a force sensor 41 for holding the contact piece 41A; a sensor attachment 42 for attaching the force sensor 41; a sensor driving mechanism 43 provided on both sides of the sensor attachment 42 in the X-axis direction for moving the sensor attachment 42, i.e., the contact piece 41A; a sensor position detecting mechanism 44 provided above sensor attachment 42 in the +Z-axis direction for detecting the position of the force sensor 41 (the contact piece 41A) in the Z-axis direction; and a pair of supports 45 provided within the case 4A (see FIG. 1) for supporting the sensor driving mechanism 43 and the sensor position detecting mechanism 44.

The force sensor 41 serving as a measuring force detector detects a measuring force exerted on the contact piece 41A when the contact piece 41A is brought into contact with the object W. The detected measuring force is outputted to the controller 3. In this exemplary embodiment, an oscillating force sensor is used for detecting the measuring force.

The sensor driving mechanism 43 serving as a moving mechanism includes a guide mechanism 431 for guiding the sensor attachment 42 in the Z-axis direction and an actuator 432 for minutely moving the sensor attachment 42.

The sensor position detecting mechanism 44 includes a Z-axis scale 441 vertically arranged on the sensor attachment 42 in the +Z-axis direction and a Z-axis scale detector 442 for detecting the position of the force sensor 41 in the Z-axis direction by reading a value of the Z-axis scale 441. The position of the force sensor 41 detected by the Z-axis scale detector 442 is outputted to the controller 3.

Further, the XY stage 22 includes a stage position detecting mechanism 27 for detecting the position of the XY stage 22 in the X- and Y-axis directions.

The stage position detecting mechanism 27 has the same arrangement as the above-described sensor position detecting mechanism 44. The stage position detecting mechanism 27 includes: an X-axis scale 271 and X-axis scale detector 272 for detecting the position of the XY stage 22 in the X-axis direction; and a Y-axis scale (not shown) and Y-axis scale detector (not shown) for detecting the position of the XY stage 22 in the Y-axis direction. The position of the XY stage 22 detected by the X-axis scale detector 272 and the Y-axis scale detector is outputted to the controller 3.

For measuring the surface texture of the object W using the surface texture measuring instrument 1, the above-described stage driving mechanism 26, the slider driving mechanism and the arm driving mechanism are initially driven based on a control signal outputted from the controller 3 so as to move the contact piece 41A in the vicinity of the surface of the object W. Subsequently, the stage driving mechanism 26 and the sensor driving mechanism 43 are driven based on a control signal outputted from the controller 3 so as to move the contact piece 41A along the surface of the object W.

Then, the surface texture measuring instrument 1 measures the surface texture of the object W based on the position of the XY stage 22 detected by the X-axis scale detector 272 and the Y-axis scale detector and the position of the force sensor 41 detected by the Z-axis scale detector 442, i.e., based on the position of the contact piece 41A.

[Detailed Arrangement of Controller]

The controller 3 includes a CPU (Central Processing Unit), a memory and the like to control the whole measuring instrument body 2 including the sensor driving mechanism 43. In this first exemplary embodiment, a control system for moving the contact piece 41A along the surface of the object W will be described, and the other description will be omitted.

As shown in FIG. 2, the controller 3 includes a target value output 31 for outputting a target value of the measuring force outputted from the force sensor 41, and a feedback controller 32 for feedback control of the actuator 432 based on a deviation between the measuring force and the target value.

The feedback controller 32 includes a force control compensator 321 for series compensation of the feedback controller 32, and a feedback compensator 322 for feedback compensation. Incidentally, a predetermined compensation element is set in the force control compensator 321 in advance.

The feedback compensator 322 performs the feedback compensation in accordance with the measuring force outputted from the force sensor 41.

Figure 3:
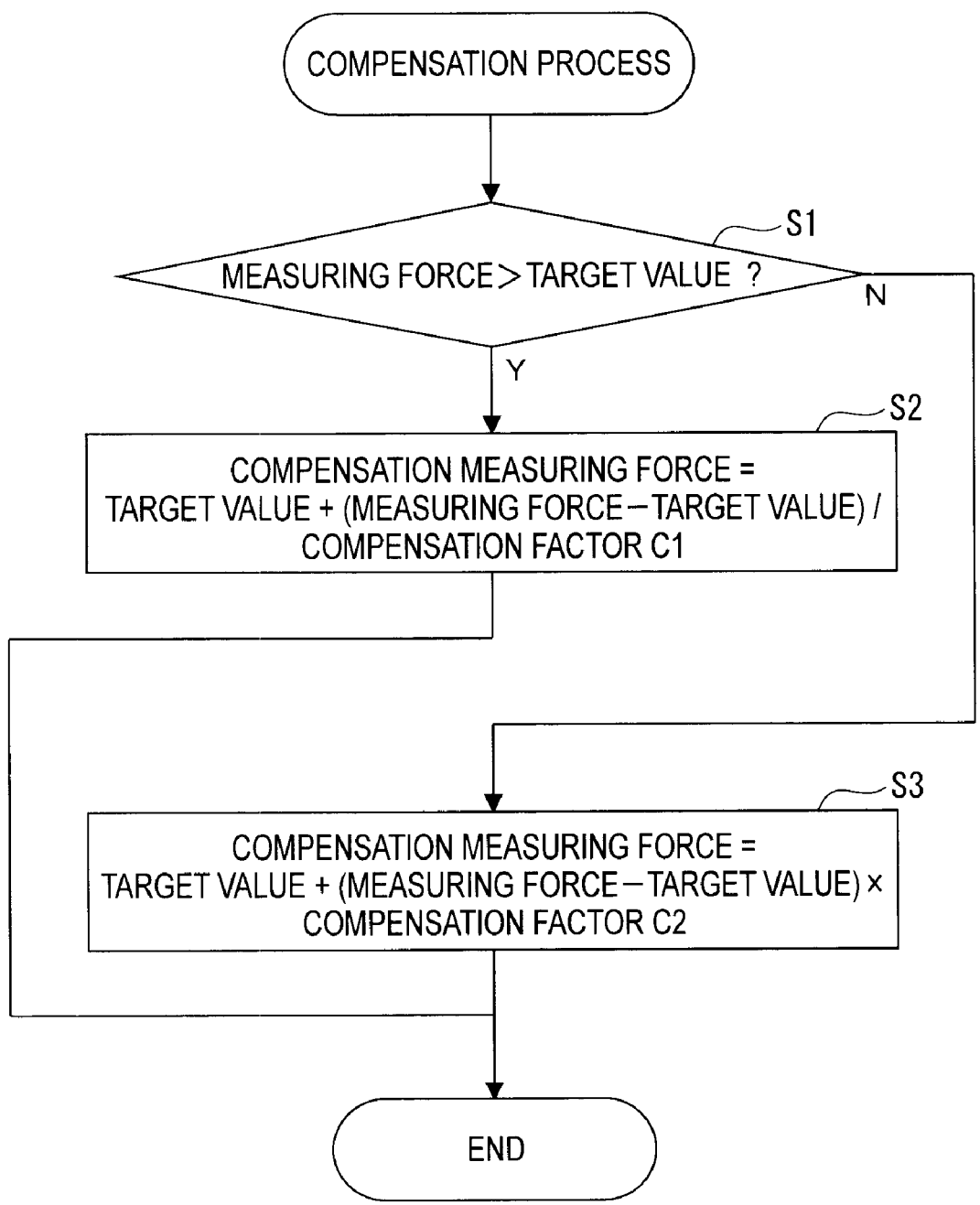
FIG. 3 is a flow chart showing a compensation process using a feedback compensator according to the first exemplary embodiment.

FIG. 3 is a flow chart showing a compensation process using the feedback compensator 322. Incidentally, a compensation measuring force indicates the measuring force outputted from the feedback compensator 322 after the feedback compensation. Also, compensation factors C1 and C2 are larger than one. In the first exemplary embodiment, the compensation factors C1 and C2 are set to be two.

When a measuring force is inputted from the force sensor 41, the feedback compensator 322 performs a step S1 to compare the inputted measuring force with a target value outputted from the target value output 31.

Subsequently, when the feedback compensator 322 determines that the measuring force is larger than the target value, a step S2 is performed to calculate and output a compensation measuring force.

When the feedback compensator 322 determines that the measuring force is equal to or smaller than the target value, a step S3 is performed to calculate and output a compensation measuring force.

Figure 4:
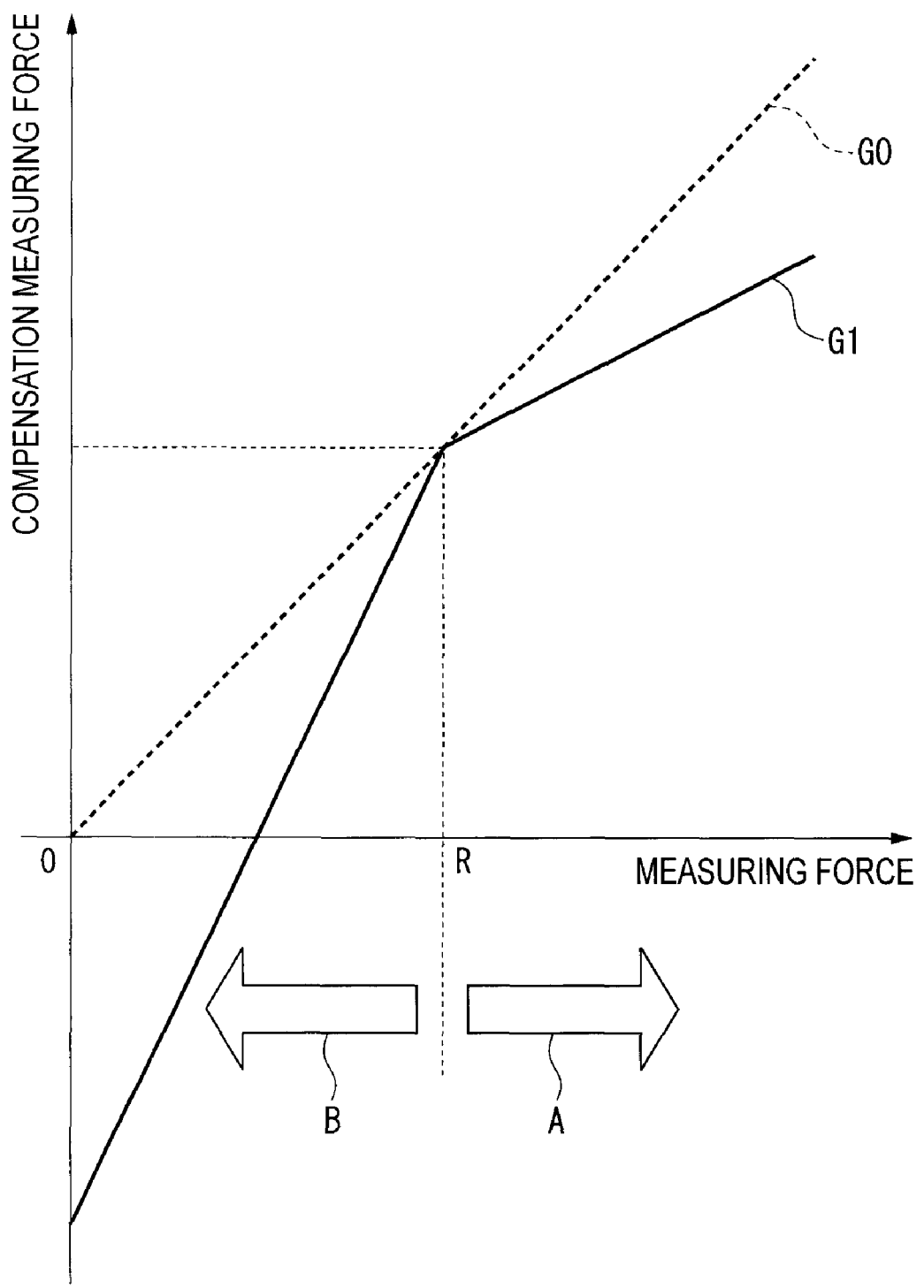
FIG. 4 shows a relationship between a measuring force and a compensation measuring force according to the first exemplary embodiment.
Figure 5:
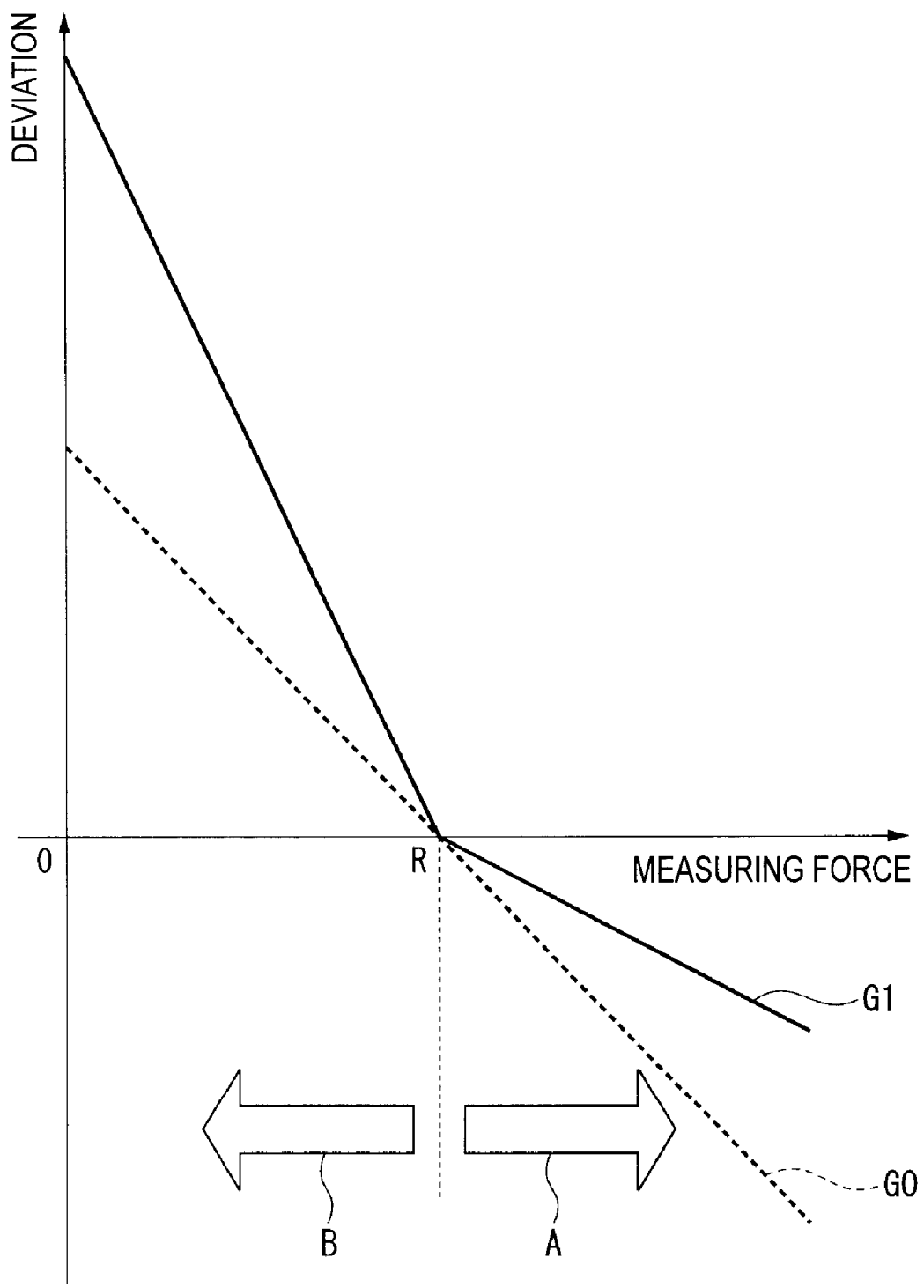
FIG. 5 shows a relationship between the measuring force and a deviation of the measuring force relative to a target value according to the first exemplary embodiment.

FIG. 4 shows a relationship between the measuring force and the compensation measuring force. FIG. 5 shows a relationship between the measuring force and a deviation of the measuring force relative to the target value. In FIG. 4, the horizontal axis indicates the measuring force and the vertical axis indicates the compensation measuring force. In FIG. 5, the horizontal axis indicates the measuring force and the vertical axis indicates the deviation. In FIGS. 4 and 5, R denotes the target value, a dashed line G0 shows a relationship when the feedback compensator 322 is not provided, and a solid line G1 shows a relationship according to the first exemplary embodiment.

When the feedback compensator 322 determines that the measuring force is larger than the target value R (a direction shown by an arrow A in FIGS. 4 and 5), the feedback compensator 322 performs the step S2 as described above to calculate the compensation measuring force. As shown in FIG. 4, the compensation measuring force becomes smaller than that calculated when the feedback compensator 322 is not provided. Accordingly, as shown in FIG. 5, the deviation becomes smaller than that calculated when the feedback compensator 322 is not provided.

When the feedback compensator 322 determines that the measuring force is equal to or smaller than the target value R (a direction shown by an arrow B in FIGS. 4 and 5), the feedback compensator 322 performs the step S3 as described above to calculate the compensation measuring force. As shown in FIG. 4, the compensation measuring force becomes smaller than that calculated when the feedback compensator 322 is not provided. Accordingly, as shown in FIG. 5, the deviation becomes larger than that calculated when the feedback compensator 322 is not provided.

The following advantages can be attained according to the first exemplary embodiment.

(1) The controller 3 includes the feedback compensator 322 for feedback compensation in accordance with the measuring force. Accordingly, the compensation measuring force can be adjusted so that the contact piece 41A is not easily moved away from the object W during measurement. The controller 3 further includes the feedback controller 32 for feedback control of the actuator 432 based on the deviation between the compensation measuring force and the target value R outputted from the target value output 31. Accordingly, the contact piece 41A is not easily moved away from the object W even when high-speed responsivity is required for the feedback controller 32. Thus, the surface texture measuring instrument 1 can improve high-speed responsivity and measuring accuracy without impairing stability of the feedback controller 32.

(2) The feedback compensator 322 performs the feedback compensation to increase the deviation between the compensation measuring force and the target value R when the measuring force detected by the force sensor 41 is equal to or smaller than the target value R. Accordingly, the actuator 432 is controlled to increase the measuring force detected by the force sensor 41. Thus, the contact piece 41A is not easily moved away from the object W even when high-speed responsivity is required for the feedback controller 32.

(3) The feedback compensator 322 performs the feedback compensation to decrease the deviation between the compensation measuring force and the target value R when the measuring force detected by the force sensor 41 is larger than the target value R. Accordingly, the actuator 432 is controlled to decrease the measuring force detected by the force sensor 41. Thus, even when the contact piece 41A is suddenly flipped up due to the geometry variation of the object W, the measuring force is not excessively changed. Consequently, a control command for moving the contact piece 41A excessively away from the object W is not supplied, whereby the contact piece 41A is not easily moved away from the object W.

[Second Exemplary Embodiment]

A second exemplary embodiment of the invention will be described below with reference to the accompanying drawings.

Figure 6:
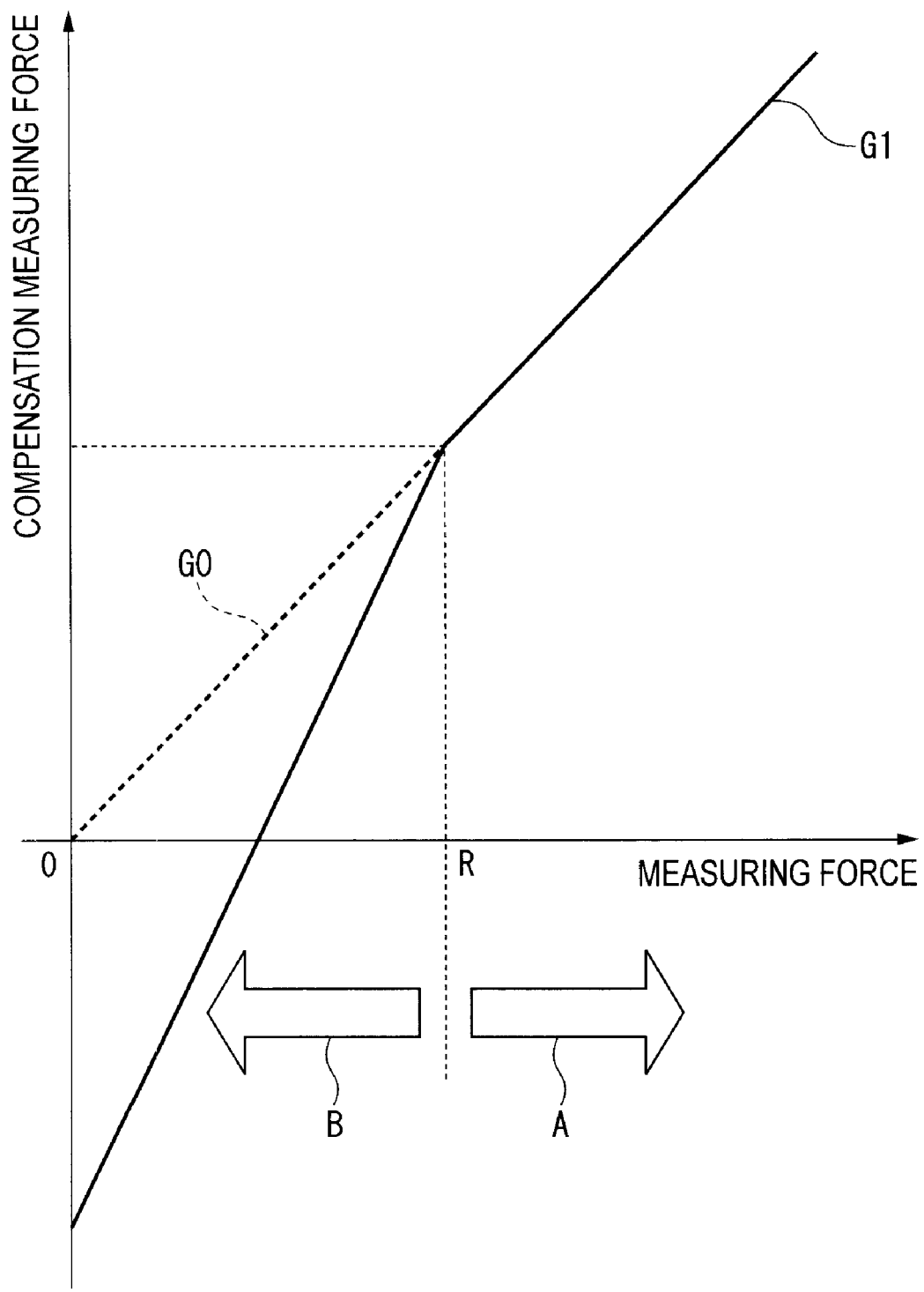
FIG. 6 shows a relationship between a measuring force and a compensation measuring force according to a second exemplary embodiment of the invention.
Figure 7:
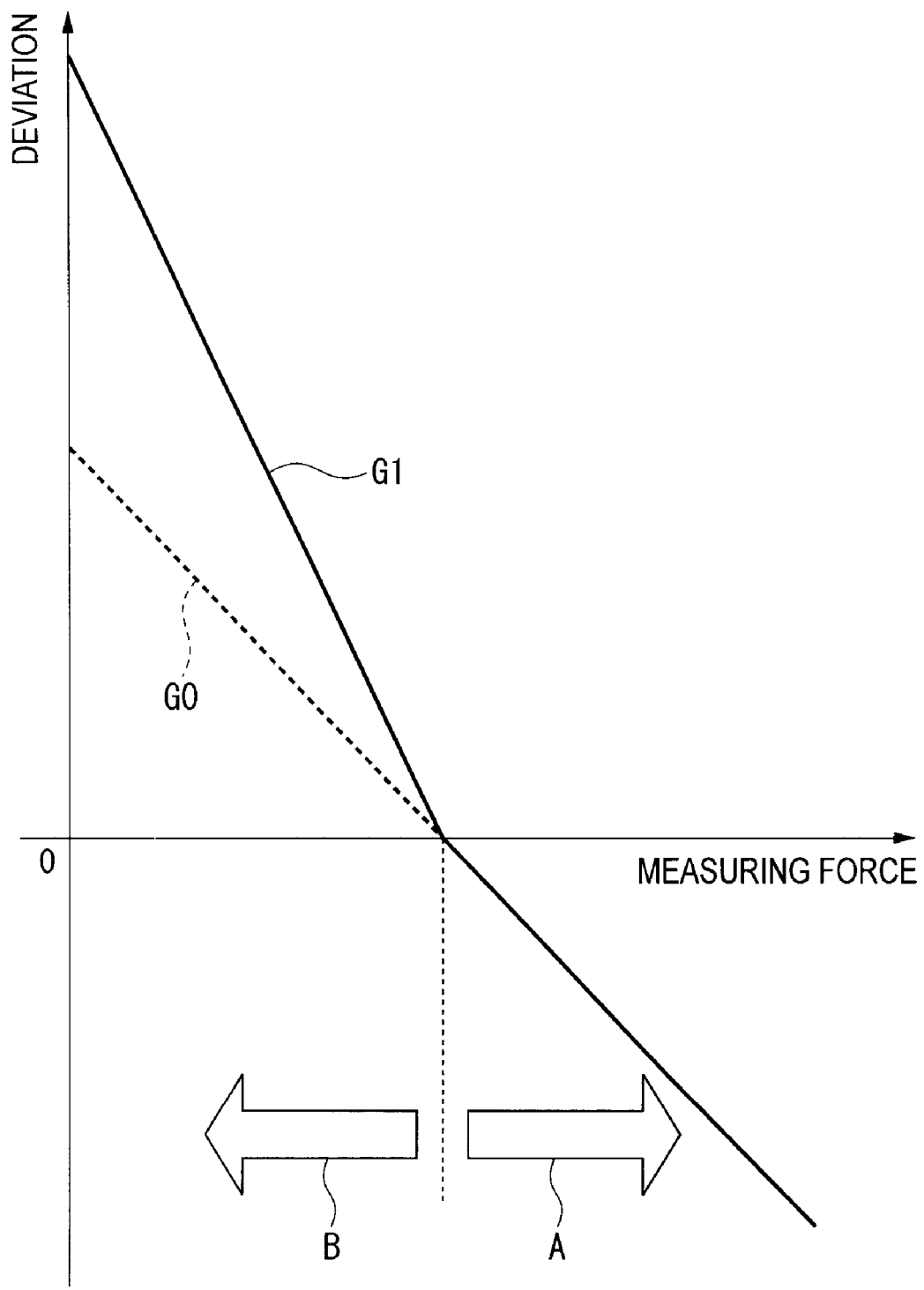
FIG. 7 shows a relationship between the measuring force and a deviation of the measuring force relative to a target value according to the second exemplary embodiment.

FIG. 6 shows a relationship between the measuring force and the compensation measuring force. FIG. 7 shows a relationship between the measuring force and the deviation of the measuring force relative to the target value.

In the first exemplary embodiment, the compensation factors C1 and C2 are set to be two. In contrast, in the second exemplary embodiment, the compensation factor C1 is set to be one and the compensation factor C2 is set to be two.

It should be noted that components which are identical or correspond to those of the first exemplary embodiment will be denoted by the same reference numerals, description of which will be omitted.

When the feedback compensator 322 determines that the measuring force is larger than the target value R (a direction shown by an arrow A in FIGS. 6 and 7), the feedback compensator 322 performs the step S2 as described above to calculate the compensation measuring force. As shown in FIGS. 6 and 7, the compensation measuring force and the deviation are the same as those calculated when the feedback compensator 322 is not provided.

When the feedback compensator 322 determines that the measuring force is equal to or smaller than the target value R (a direction shown by an arrow B in FIGS. 6 and 7), the feedback compensator 322 performs the step S3 as described above to calculate the compensation measuring force. As shown in FIG. 6, the compensation measuring force becomes smaller than that calculated when the feedback compensator 322 is not provided. Accordingly, as shown in FIG. 7, the deviation becomes larger than that calculated when the feedback compensator 322 is not provided.

In the second exemplary embodiment, the same advantages can be attained as the advantages (1) and (2) of the first exemplary embodiment.

[Modification of Exemplary Embodiment(s)]

The invention is not limited to the exemplary embodiments as described above, but may include any modification or improvement as long as an object of the invention can be achieved.

Though a measuring instrument is exemplified by the surface texture measuring instrument 1 in the above-described exemplary embodiments, the measuring instrument may be a coordinate measuring instrument or the like. In other words, the invention is favorably applicable to any measuring instrument having a contact piece to be brought into contact with an object to be measured.

In the exemplary embodiments, the feedback compensator 322 performs step 2 or step 3, which comprises a mathematical formula, for the feedback compensation in accordance with the measuring force outputted from the force sensor 41. However, the feedback compensation may be performed using other formulae. Also, a data table in which the compensation measuring force is associated with the measuring force may be stored in a memory or the like so as to perform the feedback compensation with reference to the data table. In other words, it is only required that the feedback compensator can perform the feedback compensation in accordance with the measuring force detected by the measuring force detector.

What is claimed is:

1. A measuring instrument comprising:
a contact piece to be in contact with an object;
a moving mechanism that moves the contact piece along a surface of the object;
a controller that controls the moving mechanism; and
a measuring force detector that detects a measuring force exerted on the contact piece when the contact piece is brought into contact with the object, wherein
the controller includes:
a target value output that outputs a target value of the measuring force;
a feedback controller that performs feedback control of the moving mechanism; and
a feedback compensator provided on the feedback controller, the feedback compensator adjusting the measuring force and outputting a compensation measuring force based on a result of a comparison between the target value and the measuring force, and
the feedback controller performs the feedback control based on a deviation between the target value and the compensation measuring force.

2. The measuring instrument according to claim 1, wherein the feedback compensator compares the target value with the measuring force and performs the feedback compensation to increase the deviation when the measuring force is equal to or smaller than the target value.

3. The measuring instrument according to claim 2, wherein the feedback compensator performs the feedback compensation to decrease the deviation when the measuring force is larger than the target value.

* * * * *